United States Patent [19]
Fukuchi

[11] Patent Number: 5,765,136
[45] Date of Patent: Jun. 9, 1998

[54] ENCODED DATA DECODING APPARATUS ADAPTED TO BE USED FOR EXPANDING COMPRESSED DATA AND IMAGE AUDIO MULTIPLEXED DATA DECODING APPARATUS USING THE SAME

[75] Inventor: Hiroyuki Fukuchi, Tokyo, Japan

[73] Assignee: Nippon Steel Corporation, Tokyo, Japan

[21] Appl. No.: 663,322

[22] PCT Filed: Oct. 27, 1995

[86] PCT No.: PCT/JP95/02210

§ 371 Date: Jun. 21, 1996

§ 102(e) Date: Jun. 21, 1996

[87] PCT Pub. No.: WO96/13826

PCT Pub. Date: May 9, 1996

[30] Foreign Application Priority Data

Oct. 28, 1994 [JP] Japan .................. 6-288791

[51] Int. Cl.$^6$ ..................... G01L 9/100
[52] U.S. Cl. ............... 704/500; 704/230; 704/220
[58] Field of Search .................. 395/2.91, 2.92, 395/2.93, 2.94, 2.95, 2.1, 2.14, 2.39, 2.35, 2.38, 2.29

[56] References Cited

U.S. PATENT DOCUMENTS

| | | | |
|---|---|---|---|
| 5,115,469 | 5/1992 | Taniguchi et al. | 395/2.37 |
| 5,157,760 | 10/1992 | Akagiri | 395/2.36 |
| 5,414,795 | 5/1995 | Tsutsui et al. | 395/2.38 |
| 5,581,651 | 12/1996 | Ishino et al. | 395/2.37 |
| 5,581,654 | 12/1996 | Tsutsui | 395/2.39 |
| 5,632,004 | 5/1997 | Bergstrom | 395/2.35 |

FOREIGN PATENT DOCUMENTS

| | | |
|---|---|---|
| 59-82608 | 5/1984 | Japan . |
| 63-298739 | 12/1988 | Japan . |
| 6-36158 | 2/1994 | Japan . |
| 6-202691 | 7/1994 | Japan . |
| 6-204449 | 8/1994 | Japan . |
| 6-204450 | 8/1994 | Japan . |
| 6-268969 | 9/1994 | Japan . |
| 6-276485 | 9/1994 | Japan . |
| 7-217595 | 8/1995 | Japan . |

*Primary Examiner*—David R. Hudspeth
*Assistant Examiner*—Susan Wieland
*Attorney, Agent, or Firm*—Pollock, Vande Sande & Priddy

[57] ABSTRACT

An encoded data decoding apparatus including: a circuit for sequentially receiving a series of encoded data frames, wherein each of the series of data frames includes a plurality of multiplexed band data classified into a plurality of predetermined frequency bands, each of the multiplexed band data including encoded information data belonging to a corresponding frequency band and processing data used for encoding the encoded information data, and for processing each of the data frames so as to separate the encoded information data and the processing data from each other; a circuit for decoding the encoded information data by using the processing data separated from the information data in each of the frequency bands; and any one of the following circuits, one is a circuit for determining whether each of the data frames is to be decoded or not on the basis of a level of the encoded information data belonging to at least one frequency band selected from the frequency bands included in the data frame and the other is a circuit for selecting the frame to be processed so that only the selected frame is decoded. An image audio multiplexed data decoding apparatus using the encoded data decoding apparatus.

12 Claims, 12 Drawing Sheets

ENCODED DATA DECODING APPARATUS ADAPTED TO BE USED FOR EXPANDING COMPRESSED DATA AND IMAGE AUDIO MULTIPLEXED DATA DECODING APPARATUS USING THE SAME

TECHNICAL FIELD

The invention relates to an encoded data decoding apparatus and an image audio multiplexed data decoding apparatus using the same and, more particularly, to an encoded data decoding apparatus suitable for expanding audio data which is compressed for transmission or recording to a recording medium in order to reproduce and an image audio multiplexed data decoding apparatus using the same.

BACKGROUND ART

Hitherto, there are various methods for high efficient encoding (data compression) a signal such as audio signal, voice, or the like. One of them is, for example, a band division encoding method (sub-band encoding method) in which the audio signal or the like is divided into a plurality of frequency bands and encoded. As an example of the sub-band encoding method, there is a method of ISO/IEC 11172-3 as an international standardization called an MPEG audio method.

Although an encoding apparatus according to the sub-band encoding method is well known as disclosed in, for example, Japanese Patent Application Nos. 6-204449 and 6-204450 (corresponding U.S. patent application Ser. No. 08/511449), such an apparatus will now be described with reference to FIG. 10 for better understanding the invention.

In FIG. 10, for a digital audio signal supplied to an input terminal 50, an audio signal is sampled at a predetermined time interval by a dividing filter bank circuit 30 to obtain the audio signal included in the time interval (called one frame). Signal components of different frequencies included in the audio signal of each frame are divided into a plurality of predetermined frequency bands and floating processes are applied to the signals of the divided frequency bands by floating processing circuits 31, 32, 33, and 34, respectively.

In this instance, the floating process is a process for multiplying a common value to the signal component in each of the divided bands, thereby increasing its value in order to raise the precision of a quantizing process by a subsequent quantizing circuit. For example, a maximum value among the absolute values of the signal components included in the respective bands is searched and the floating process is carried out by using a floating coefficient which is determined to increase the maximum value to a value as large as possible, but not saturated, namely, not exceeding "1". In Table 1, examples of the floating coefficients to be used in the foregoing method of ISO/IEC 11172-3 are shown.

TABLE 1

| Index | Floating Coefficient | Index | Floating Coefficient |
|---|---|---|---|
| 0 | 2.00000000000000 | 31 | 0.00155019633981 |
| 1 | 1.58740105196820 | 32 | 0.00123039165029 |
| 2 | 1.25992104989487 | 33 | 0.00097656250000 |
| 3 | 1.00000000000000 | 34 | 0.00077509816991 |
| 4 | 0.79370052598410 | 35 | 0.00061519582514 |
| 5 | 0.62996052494744 | 36 | 0.00048828125000 |
| 6 | 0.50000000000000 | 37 | 0.00038754908495 |

TABLE 1-continued

| Index | Floating Coefficient | Index | Floating Coefficient |
|---|---|---|---|
| 7 | 0.39685026299205 | 38 | 0.00030759791257 |
| 8 | 0.31498026247372 | 39 | 0.00024414062500 |
| 9 | 0.25000000000000 | 40 | 0.00019377454248 |
| 10 | 0.19842513149602 | 41 | 0.00015379895629 |
| 11 | 0.15748013123686 | 42 | 0.00012207031250 |
| 12 | 0.12500000000000 | 43 | 0.00009688727124 |
| 13 | 0.09921256574801 | 44 | 0.00007689947814 |
| 14 | 0.07874506561843 | 45 | 0.00006103515625 |
| 15 | 0.06250000000000 | 46 | 0.00004844363562 |
| 16 | 0.04960628287401 | 47 | 0.00003844973907 |
| 17 | 0.03937253280921 | 48 | 0.00003051757813 |
| 18 | 0.03125000000000 | 49 | 0.00002422181781 |
| 19 | 0.02480314143700 | 50 | 0.00001922486954 |
| 20 | 0.01966626640461 | 51 | 0.00001525878906 |
| 21 | 0.01562500000000 | 52 | 0.00001211090890 |
| 22 | 0.01240157071850 | 53 | 0.00000961243477 |
| 23 | 0.00984313320230 | 54 | 0.00000762939453 |
| 24 | 0.00781250000000 | 55 | 0.00000605545445 |
| 25 | 0.00620078535925 | 56 | 0.00000480621738 |
| 26 | 0.00492156660115 | 57 | 0.00000381469727 |
| 27 | 0.00390625000000 | 58 | 0.00000302772723 |
| 28 | 0.00310039267963 | 59 | 0.00000240310869 |
| 29 | 0.00246078330058 | 60 | 0.00000190734863 |
| 30 | 0.00185312500000 | 61 | 0.00000151386361 |
|  |  | 62 | 0.00000120155435 |

In the encoding apparatus in FIG. 10, the floating process is performed by using a proper value selected from the values of the floating coefficients in Table 1. For example, in the case where the maximum absolute value of the signal components included in a certain frequency band is equal to 0.75, one of the values of the floating coefficient in Table 1 and which provides, when multiplying "0.75" by its reciprocal, a maximum multiplying product not exceeding "1", namely, 0.79370052598410 is used as a floating coefficient. The floating coefficient to be used is represented by a corresponding index 4 in the apparatus.

An input signal from the input terminal 50 and the floating coefficients from the floating processing circuits 31 to 34 are also inputted to a signal characteristics calculating circuit 40. Signal characteristics are calculated by the signal characteristics calculating circuit 40 and are supplied to an adaptive bit allocating circuit 41. As signal characteristics, for example, a magnitude of an energy of the signal of each band is used.

In the adaptive bit allocating circuit 41, the number of bits allocated in each frequency band is determined by using the signal characteristics and bit length information is outputted to quantizing circuits 35, 36, 37, and 38. In each of the quantizing circuits 35, 36, 37, and 38, the quantization is performed by an adaptive bit length for every band. The quantized data, floating coefficients, and bit length information are multiplexed by a multiplexing circuit 39 and the resultant data is outputted from an output terminal 51 as encoded data. The above processes are performed on the basis of a unit of frame constructed by a sample of a predetermined length.

An example of the conventional decoding apparatus for the sub-band encoding method will now be described with reference to FIG. 11.

The multiplexed encoded data is inputted to a demultiplexing circuit 1 through an input terminal 21. The demultiplexing circuit 1 separates the inputted encoded data into band data, which is sectioned to one of a plurality of frequency bands and header information and outputs the header information to a header information decoding circuit 12 and outputs the band data to a corresponding one of the inverse quantizing circuits 2, 3, 4, and 5.

The inverse quantizing circuits 2 to 5 perform inverse quantizing processes to every band data and output the resultant data to inverse floating processing circuits 6, 7, 8, and 9. The inverse floating processing circuits 6 to 9 perform inverse floating processes to the inversely quantized data of each band and output the resultant data to a synthesizing filter bank circuit 10. The synthesizing filter band circuit 10 synthesizes the signals of the respective bands into one signal and outputs it.

The above header information decoding circuit 12 separates and decodes the header information to the bit length information of each band that is necessary for the header information inverse quantizing process of each band and the floating coefficient of each band that is necessary for the inverse floating process and outputs the bit length information to the inverse quantizing circuits 2, 3, 4, and 5 and the floating coefficients to the inverse floating processing circuits 6, 7, 8, and 9. Since the floating coefficients for every band are set to fixed index values as shown in Table 1, the floating coefficients as actually used are decoded on the basis of Table 1.

In case of a normal decoding process, an output signal from the synthesizing filter bank circuit 10 is selected by a switching circuit 20 and outputted as a digital audio signal from an output terminal 22.

A digital VTR is one example of an application of an audio encoding technique. In the digital VTR, it is necessary to realize a fast-forward reproducing (high-speed reproducing) function in a manner similar to the normal VTR.

As a method of realizing the fast-forward reproduction, of decoding audio data at a speed of, for example, two times normal will now be described.

In this case, the encoded data is inputted from the input terminal 21 to the decoding apparatus at a speed that is two times as high as the normal speed. The demultiplexing circuit 1, inverse quantizing circuits 2 to 5, inverse floating processing circuits 6 to 9, synthesizing filter bank circuit 10, and header information decoding circuit 12 are also made to operate at a speed that is two times as high as the normal speed. The decoded data of an amount double the normal amount is outputted from the synthesizing filter bank circuit 10.

A frequency of output data from the synthesizing filter bank circuit 10 is shifted by a frequency shifting circuit 18. Such a process is performed in order to prevent, for example, a human voice or the like becoming higher than usual, since the data is increased twice, the frequency is also doubled.

An output of the frequency shifting circuit 18 is thinned out into a half density by a subsampling circuit 19 and is set to the same length as that of the normal data and is outputted to the switching circuit 20. An output signal of the subsampling circuit 19 is outputted from the output terminal 22 through the switching circuit 20.

In the above decoding apparatus, however, although it is necessary to provide the frequency shifting circuit 18 and subsampling circuit 19 in order to perform the fast-forward reproduction, the frequency shifting circuit 18 has a problem that since the frequency of each signal component is set to, for example, ½, the frequency to be shifted is different depending on the frequency of each signal component, so that a circuit construction becomes quite large.

In the case of fast-forward reproducing at a speed of M-times, the demultiplexing circuit 1, inverse quantizing circuits 2 to 5, inverse floating processing circuits 6 to 9, synthesizing filter bank circuit 11, and header information decoding circuit 12 need to be operated at a speed of M-times, so that there is also a problem that the circuit construction becomes very complicated.

Further, particularly, in the case of reproducing a human voice, although a deviation of the frequency of the reproduced sound is suppressed, there is also a problem that the tempo is fast and it is very hard to listen to the sound.

It is a first object of the invention to provide an encoded data decoding apparatus such that a high-speed reproduction of data obtained by encoding a voice or a general audio signal can be realized by a simple circuit construction.

A second object of the invention is to provide an image audio multiplexed data decoding apparatus in which when multiplexed data of encoded image data and encoded audio data are decoded by using the above encoded data decoding apparatus and reproduced at a high speed, a portion in which a voice is recorded can be easily searched.

SUMMARY OF INVENTION

An encoded data decoding apparatus according to the invention comprises: a circuit for sequentially receiving and processing a series of encoded data frames, in which each of the series of data frames includes a plurality of multiplexed band data divided into a plurality of predetermined frequency bands. Each of the multiplexed band data includes encoded information data belonging to the corresponding frequency band and processing data which have been used for encoding the encoded information data, so as to separate each data frame into the encoded information data and the processing data. Circuit means is provided for decoding the encoded information data in each of the frequency bands by using the processing data separated from the information data. At least one of 1) means for deciding whether each of the data frames should be decoded or not on the basis of a level of the encoded information data belonging to at least one band selected from the frequency bands included in the data frame and 2) means for selecting the frame to be processed so as to decode only the selected one of the series of data frames is also provided.

According to the encoded data decoding apparatus of the invention, in the case where whether each data frame should be decoded or not is determined on the basis of the level of the encoded information data belonging to at least one of the band selected from the plurality of frequency bands included in the data frame, an audio signal of a good quality can be reproduced in a high-speed reproduction, by selecting the frequency band in which the audio signal is included. In a preferred embodiment, since the information level can be easily judged by using a floating coefficient, which has been used for obtaining the encoded data, the circuit construction can be simplified.

On the other hand, in the case of decoding only the selected frame among the series of data frames, a reproduced sound of a constant speed can be obtained in the high-speed reproduction in the case where sound portions continuously appear like music.

An image audio multiplexed data decoding apparatus according to the invention comprises accumulating means for sequentially receiving a series of encoded data frames and holding at least one frame. Each of the data frames includes image data and audio data which are encoded and multiplexed, respectively. Reading means capable of reading out the data frame held in the accumulating means at a controlled speed are provided, along with means for separating the encoded image data and the encoded audio data, which are included in the data frame read out by the reading means, from each other. A image decoding circuit is used for decoding the separated encoded image data and an audio data buffer is used for temporarily storing the separated encoded audio data. An audio decoding circuit is provided for reading out the encoded audio data stored in the audio buffer and decoding. Means for monitoring an amount of the audio data stored in the audio data buffer are provided. Means are provided for controlling the reading speed of the data frame by the reading means in accordance with a change in amount of the audio data which has been stored in the audio data buffer and which is monitored by the monitoring means, wherein the encoded data decoding apparatus of the invention is preferably used as the audio decoding circuit.

The image audio multiplexed data decoding apparatus according to the invention can reproduce the image data at a reproducing speed corresponding to the reproducing speed of the audio data in the high-speed reproduction, so that a desired portion can be easily searched in the high-speed reproduction.

BRIEF DESCRIPTION OF DRAWINGS

FIGS. 7A and 7B are diagrams for explaining a decoding process of an audio signal in the high-speed reproducing mode using the floating coefficient, in which FIG. 7A shows a waveform of an original audio signal and FIG. 7B shows a decoded signal waveform;

FIGS. 8A and 8B are diagrams for explaining a decoding process of the audio signal in the high-speed reproducing mode using the frame count number, in which FIG. 8A shows a waveform of an original audio signal and FIG. 8B shows a decoded signal waveform;

DETAILED DESCRIPTION OF THE INVENTION

Figure 10:
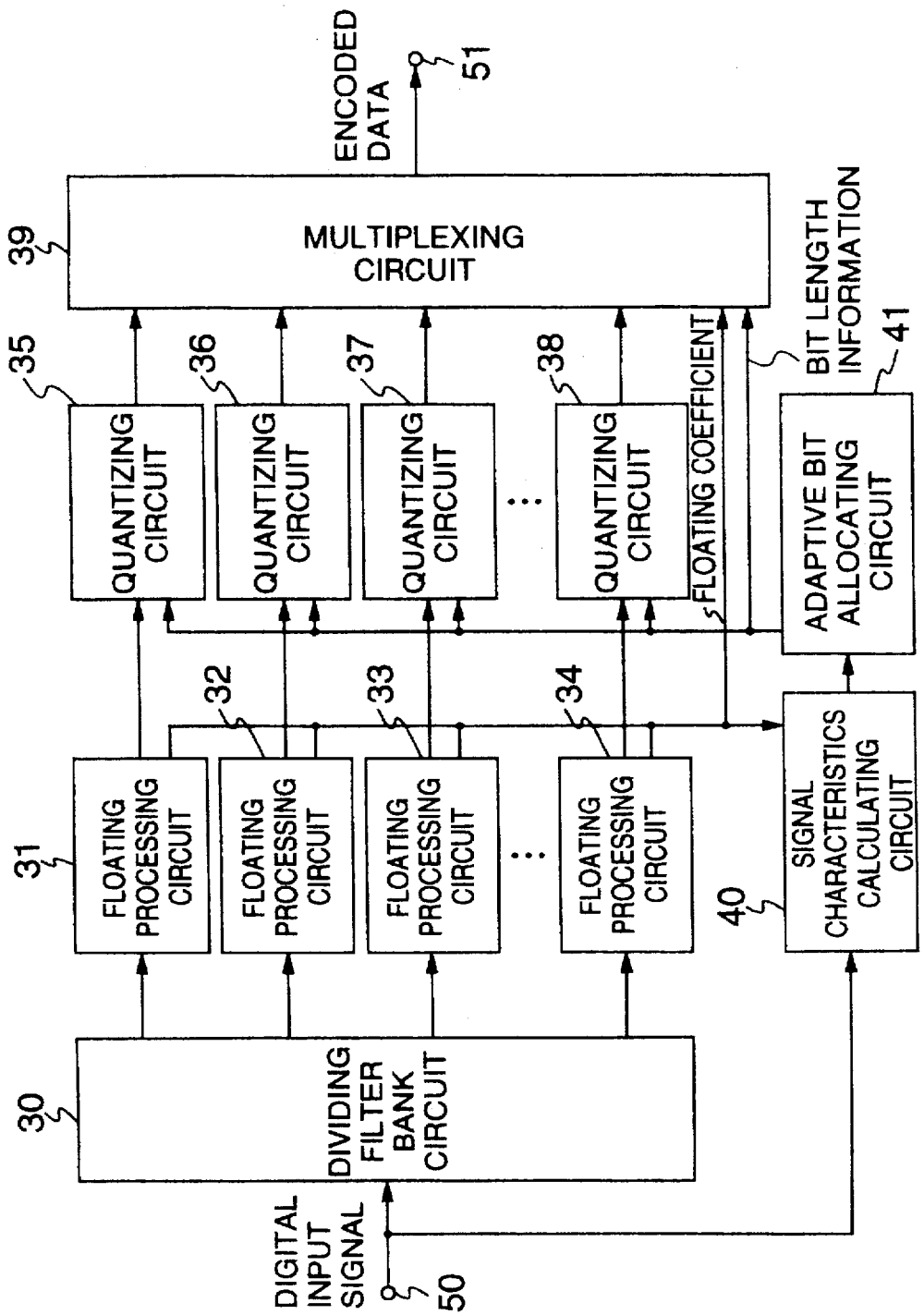
FIG. 10 is a block diagram showing an example of a conventional encoding apparatus which is used to generate encoded data that is inputted to the encoded data decoding apparatus of the invention.
Figure 11:
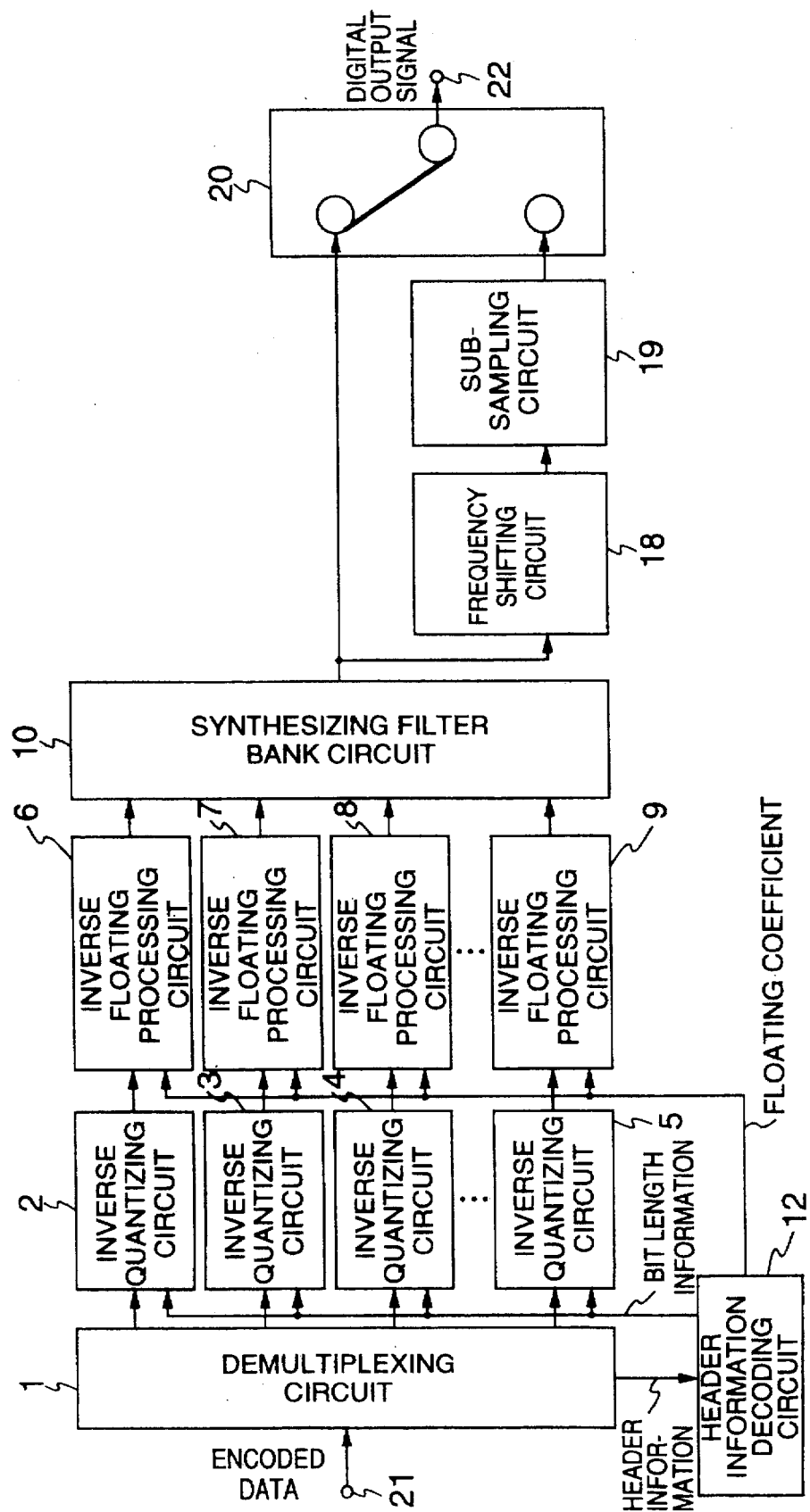
FIG. 11 is a block diagram showing a construction of a conventional encoded data decoding apparatus.

A decoding apparatus of encoded audio data according to an embodiment of the invention will now be described with reference to FIG. 1. The audio data decoding apparatus according to this embodiment is for decoding data which is obtained by compressing and encoding a digital signal, such as an audio PCM signal derived by using the audio data encoding apparatus which has been described with reference to FIG. 10.

Figure 1:
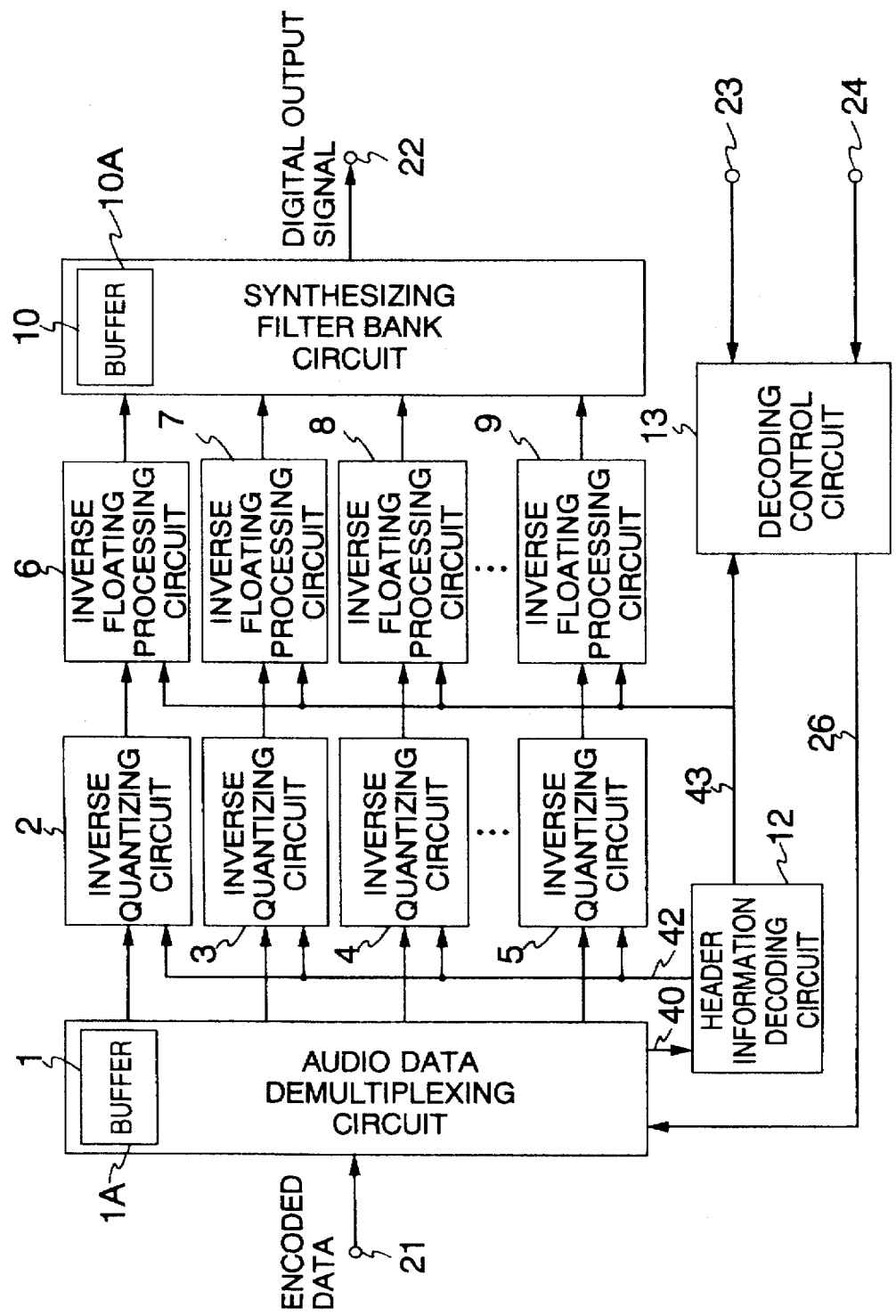
FIG. 1 is a block diagram showing a construction of an encoded data decoding apparatus according to the first embodiment of the invention.

As shown in FIG. 1, the encoded audio data is inputted to the input terminal 21. The encoded audio data includes a series of data frames which are obtained by dividing the encoded audio data at a predetermined time interval. The audio data demultiplexing circuit 1 samples the data of one frame at every predetermined time interval mentioned above and holds the data in a buffer 1A. The buffer 1A has an area to hold at least two or more frames. As described in the conventional apparatus with reference to FIG. 10, the data of each frame includes the encoded audio data which is obtained by classifying the audio signals of various different frequency components included in one frame of the original audio signal into a plurality of, for example, 32 predetermined frequency bands and by performing a floating process and a quantizing process to the signal components in each of the frequency bands and header information indicative of processing data such as floating coefficient and bit length information which are used for the floating process and quantizing process. The demultiplexing circuit 1 sequentially reads out a plurality of data frames held in the buffer 1A, separates the audio data and the processing data of each frequency band from the data of each frame, supplies the audio data to a corresponding one of the inverse quantizing circuits 2, 3, 4, 5, and also supplies header information 40 to the header information decoding circuit 12.

The header information decoding circuit 12 decodes the received header information, obtains bit length information 42 and a floating coefficient 43 of each frequency band, supplies the bit length information 42 of each frequency band to a corresponding one of the inverse quantizing circuits 2 to 5, and also supplies the floating coefficient 43 to a decoding control circuit 13 and a corresponding one of the inverse floating processing circuits 6 to 9. Each of the inverse quantizing circuits 2 to 5 inversely quantizes the received audio data of each frequency band by the bit length information. Each of the inverse floating processing circuits 6 to 9 executes an inverse floating process to the inversely quantized audio signal of each frequency band by using the supplied floating coefficient. The signals of the respective frequency bands obtained as mentioned above are synthesized by the synthesizing filter bank circuit 10 and a resultant signal is outputted as a decoded digital audio signal through the output terminal 22. Since the above operations are the same as those in the case of the conventional decoding circuit, the detailed description of each process is omitted.

It is a feature of the first embodiment of the invention that in order to select and reproduce only a desired signal such as an audio signal, in the audio data inputted in the high-speed reproducing mode, the decoding control circuit 13 is provided for controlling the decoding process by using the floating coefficient.

The decoding control circuit 13 determines whether the audio data of the current frame which is now being processed is to be decoded and reproduced, or not on the basis of the floating coefficient transmitted for every band, a threshold value set through an input terminal 23, and a frequency band set through an input terminal 24. Namely, since the floating coefficient is determined by a level of the maximum absolute value of the data in each band, the floating coefficient shows the level of the maximum absolute value of the data of each band.

For example, in the case where the user wants to decode and reproduce only the audio signal in the audio data, one or a plurality of frequency bands included in an ordinary frequency range of the audio signal are set by the signal from the input terminal 24. When the audio signal is included in the set band, since the absolute value of the audio signal is higher than the absolute value of another non-audio signal, a threshold value corresponding to the ordinary level of the absolute value of the audio signal is set by the input terminal 23. In the case where a plurality of bands are set, the maximum value of the floating coefficients of the respective set bands is detected and the maximum floating coefficient is compared with the threshold value. When the floating coefficient is larger than the threshold value, it is judged that the data of the set band of the current frame that is now being processed includes the audio signal. The decoding control circuit 13 turns on a next frame read control signal 26 which is supplied to the demultiplexing circuit 1. The demultiplexing circuit 1 continues the decoding reproducing process of the current frame which is now processed, reads out the next frame from the buffer 1A, and starts the decoding process of the next frame.

On the other hand, when the maximum floating coefficient of the set band is not larger than the set threshold value, the decoding control circuit 13 judges that the audio signal is not included in the band. The decoding control circuit turns off the next frame read control signal 26 which is supplied to the demultiplexing circuit 1. The demultiplexing circuit 1 interrupts the process of the current frame which is now being processed.

Figure 2:
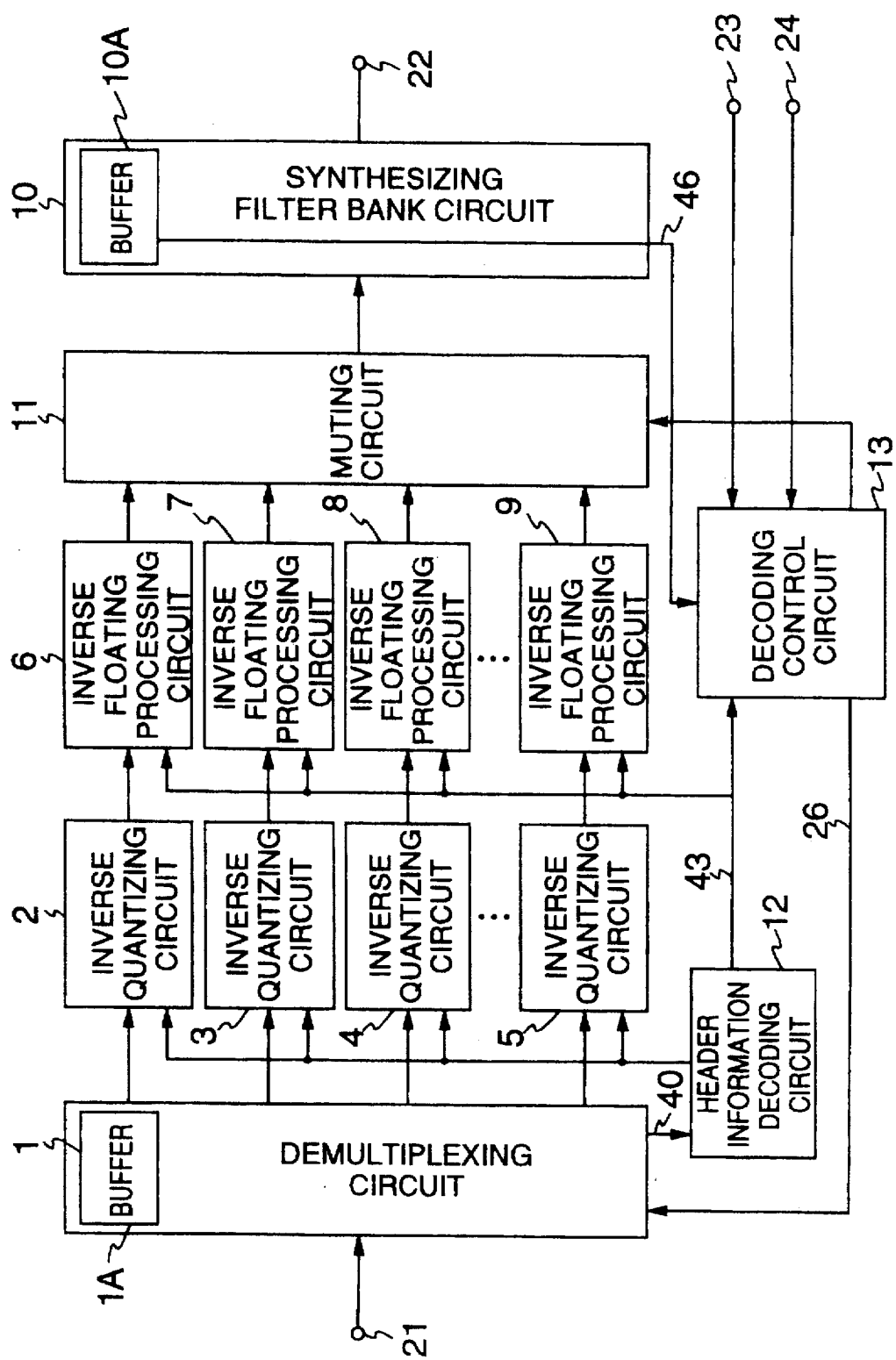
FIG. 2 is a block diagram showing a construction of an encoded data decoding apparatus according to the second embodiment of the invention.

An encoded data decoding apparatus according to the second embodiment of the invention will now be described with reference to FIG. 2. According to the second embodiment, a muting circuit 11 which is controlled by the decoding control circuit is further provided between the inverse floating circuits 6 to 9 and the synthesizing filter bank circuit 10. Although the decoding control circuit 13 in FIG. 2 has substantially the same function as the decoding control circuit 13 in the first embodiment, the decoding control circuit 13 further generates a signal 27 to control the muting circuit 11. The control signal 27 is turned on or off in accordance with a state of a buffer 10A provided in the synthesizing filter bank circuit 10.

The muting circuit 11 is controlled by the control signal 27 which is supplied from the decoding control circuit 13. When the control signal 27 is ON, the muting circuit 11 outputs the signals of the respective bands which are supplied from the inverse floating processing circuits 6 to 9 to the synthesizing filter bank circuit 10 as they are. When the control signal 27 is OFF, the muting circuit 11 sets all of the signals of the respective bands which are supplied from the inverse floating processing circuits 6 to 9 to zero and outputs these to the synthesizing filter bank circuit 10. The other operations of the second embodiment are the same as those in the first embodiment.

Figure 4:
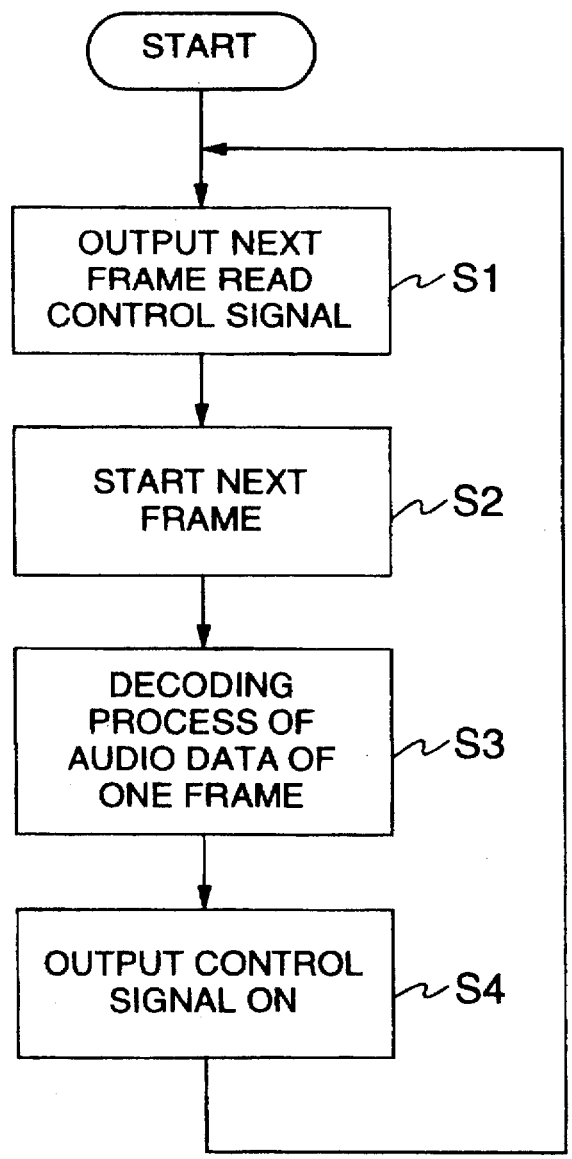
FIG. 4 is a flowchart showing the operation of a decoding process in a normal reproducing mode of the encoded data decoding apparatus according to the second embodiment.

A decoding process of the second embodiment will now be described with reference to FIGS. 4 and 5. In the case of the decoding process at an ordinary reproducing speed, all of the frames are decoded. FIG. 4 shows a flowchart for the decoding process at the ordinary reproducing speed.

In the diagram, in step S1, the decoding control circuit 13 turns on the next frame read control signal 26. When the demultiplexing circuit 1 receives the signal 26, the demultiplexing circuit 1 starts a process of the next frame in step S2.

In step S3, the data of one frame is decoded. In step S4, the output control signal 27 is turned on, thereby outputting the audio data. After that, the processing routine returns to step S1 and the next frame read signal 26 is again turned on. The decoding of the next frame is started from step S2. This operation is similar in a second decoding control circuit 14 of the third embodiment, which will be explained below.

Figure 5:
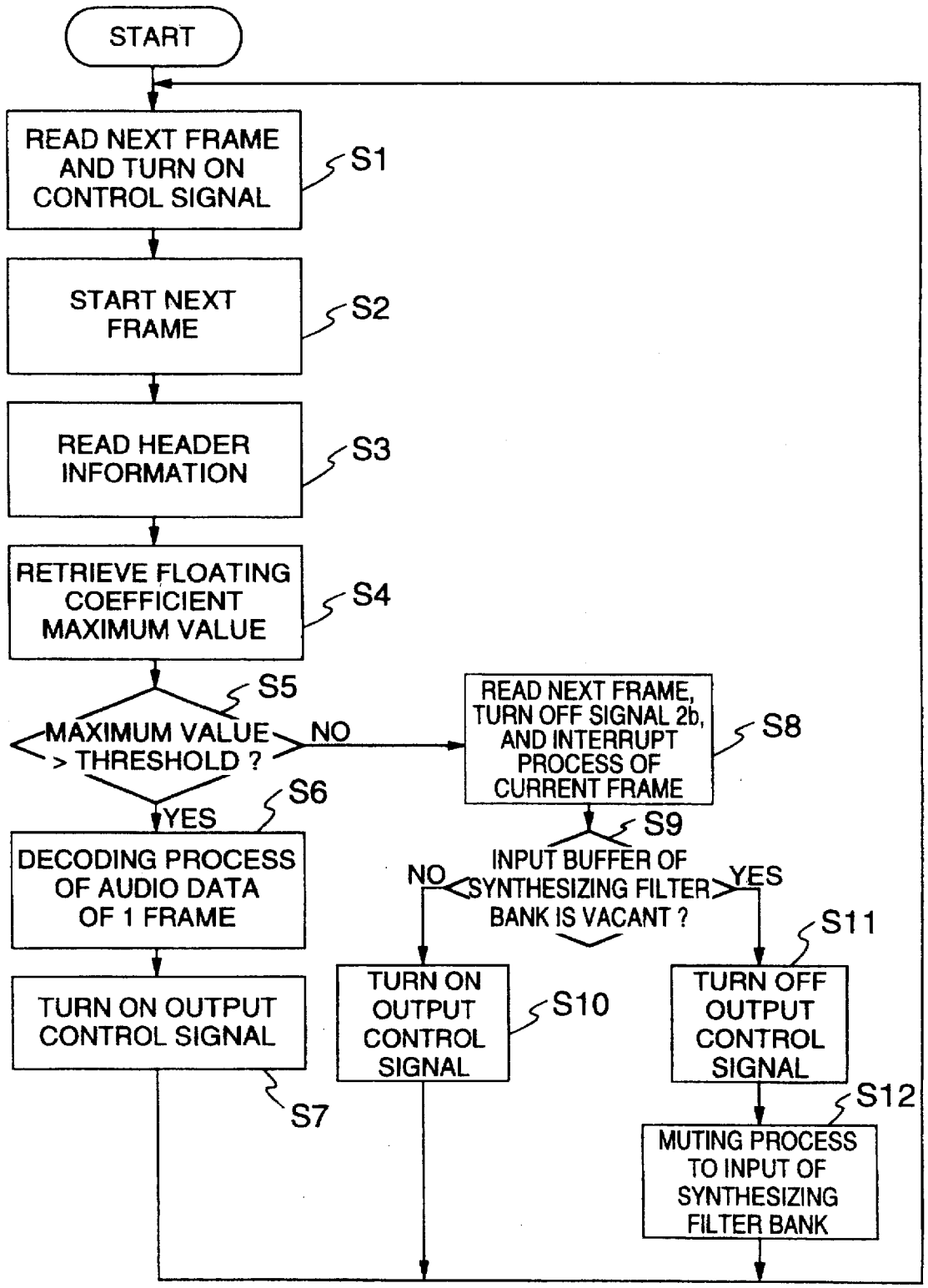
FIG. 5 is a flowchart showing the operation of a decoding process in a high-speed reproducing mode using a floating coefficient of the encoded data decoding apparatus according to the second embodiment.

FIG. 5 shows a flowchart for a decoding process in the high-speed reproducing mode using the floating coefficient in the second embodiment.

In FIG. 5, in step S1, the decoding control circuit 13 turns on the next frame read control signal 26. When the demultiplexing circuit 1 receives the signal 26, the demultiplexing circuit 1 starts the process of the next frame in step S2.

In step S3, the demultiplexed header information is inputted to the header information decoding circuit 12 and the decoding process (reading process) of the header information is performed. In the decoded header information, the floating coefficient that is transmitted for each band is inputted to the decoding control circuit 13. In step S4, the maximum value among the floating coefficients only in the bands which are set through the input terminal 24 is retrieved. In next step S5, the maximum value of the floating coefficient as retrieved is compared with the threshold value set through the input terminal 23.

As a result of the comparison, when the maximum value of the floating coefficient is larger than the threshold value, the decoding control circuit 13 decides that the current frame is decoded. The process of the current frame is continued. Namely, in step S6, the data of one frame is decoded. In step S7, the output control signal 27 is turned on, thereby outputting the audio data. After that, the processing routine returns to step S1. The next frame read control signal is turned on again and the decoding of the next frame is started from step S7.

On the other hand, when the comparison in step S5 shows that the maximum value of the floating coefficient is not larger than the threshold value, the decoding control circuit 13 determines that the frame is not decoded in step S8. The next frame read control signal 26 is turned off and the process of the current frame is interrupted. In step S9, the buffer memory in the synthesizing filter bank circuit 10 is checked.

The synthesizing filter bank circuit 10 has therein the buffer memory 10A for input data for the frame process. Until the buffer memory becomes vacant, the filtering process can be performed and the synthesized decoded reproduction signal is continuously outputted. Namely, the capacity of the buffer memory is ordinarily set to a data amount corresponding to the length of one frame. Even in the case where the current frame is skipped without decoding, if the data of the next frame which has been subjected to the inverse floating process for each band is inputted into the input buffer memory before the input buffer memory becomes vacant, that is, within a time of one frame, the decoded data can be continuously outputted.

Therefore, the decoding control circuit 13 turns off the output control signal 27 to the muting circuit 11 only when the input buffer memory becomes vacant (step S11). In this manner, the audio data can be continuously outputted while skipping several frames. Even in the case where no data exists in the buffer memory, it is controlled by the muting process in step S12, so as not to generate a sound that is hard to listen to. When the input buffer memory is not vacant, the output control signal 27 is turned on in step S10.

After completion of the process of checking the buffer memory in the synthesizing filter bank circuit 10 as mentioned above, the processing routine returns to step S1. The next frame read control signal 26 supplied to the demultiplexing circuit 1 is again turned on. When receiving the next frame read control signal 26 (ON), the demultiplexing circuit 1 starts to read out the next frame without outputting the signal information of each band of the current frame which is now decoded to each of the inverse quantizing circuits 2 to 5. In this manner, the current frame is skipped and high-speed reproduction is executed.

Figure 7A:
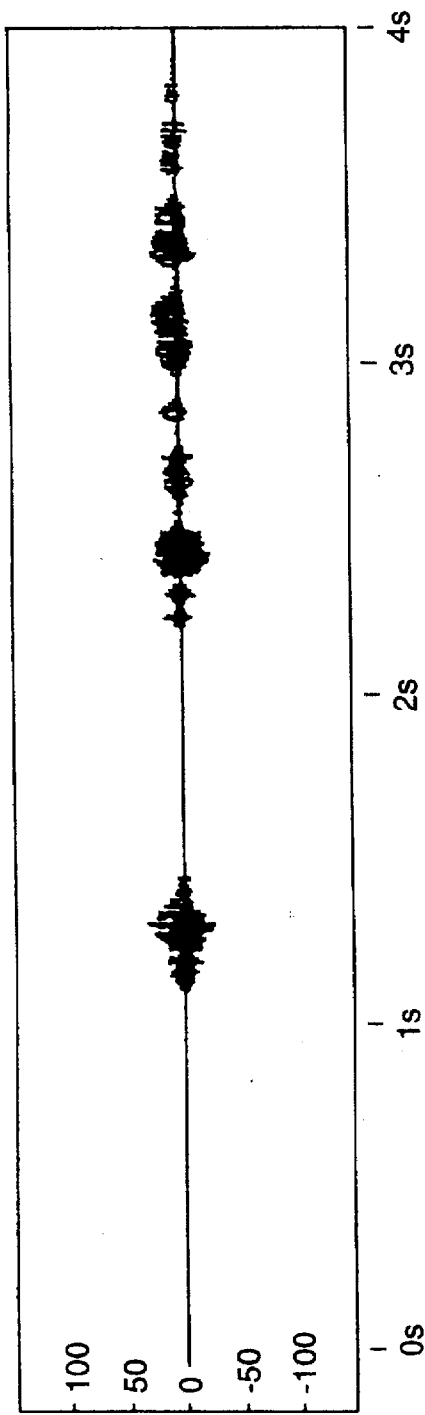
Figure 7B:
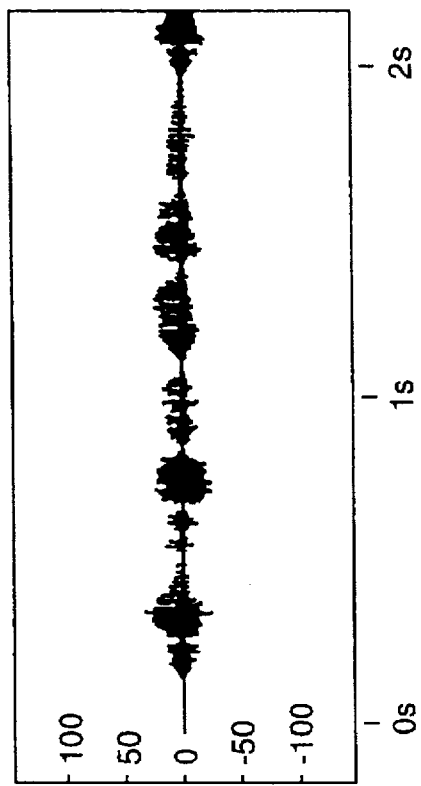

An original sound signal of a human voice is shown in FIG. 7A. FIG. 7B shows a result in the case where after the original sound signal is encoded, the floating coefficient of the index 20 shown in Table 1 is set as a threshold and high-speed reproduction is executed. In FIG. 7B, a soundless portion between intermittent voices in FIG. 7A is deleted and only the sound portions of the voice are outputted. It will be understood that the outputted sound portions have partially the same waveform as that of the original sound.

The decoding process in the high-speed reproduction using the floating coefficient described above is effective, particularly, when decoding a signal such that the sound portion and the soundless portion are clearly distinguished like a human voice and the sound portions appear intermittently.

Figure 3:
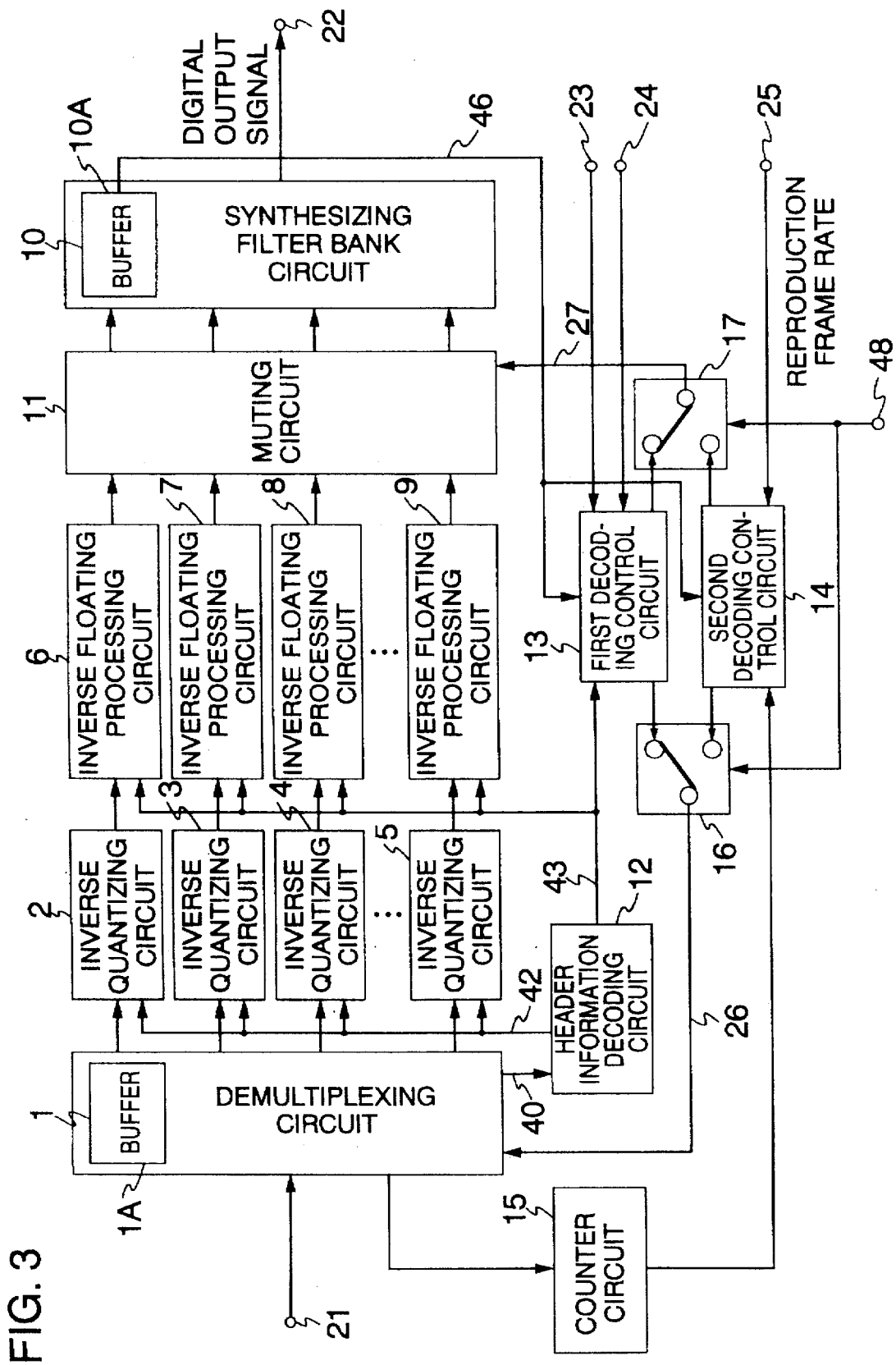
FIG. 3 is a block diagram showing a construction of an encoded data decoding apparatus according to the third embodiment of the invention.

An encoded data decoding apparatus according to the third embodiment of the invention will now be described with reference to FIG. 3. According to the third embodiment, the second decoding control circuit 14, a counter circuit 15, and switches 16 and 17 are provided as an addition to the second embodiment. The first decoding control circuit 13 in FIG. 3 is functionally the same as the decoding control circuit 13 in FIG. 2.

The third embodiment is suitable to decode and reproduce only partially a series of frames of the audio signal which is inputted in the case where the sound portion continues like music and high-speed reproduction according to the first embodiment is not suitable. A reproduction frame rate indicative of a ratio of the number of frames to be decoded and reproduced to the total number of frames which are inputted is supplied from an input terminal 25 to the second decoding control circuit 14. The counter circuit 15 counts the number of frames to be processed by the demultiplexing circuit 1 and generates a signal for turning on or off the next frame read control signal 26, as will be explained below, on the basis of a count number of the counter circuit 15 and the reproduction frame rate inputted from the input terminal 25. In a manner similar to the first decoding control circuit 13, the counter circuit 15 generates a signal for turning on or off the control signal 27 in accordance with the state of the buffer 10A of the synthesizing filter bank circuit 10. A switching between a mode in which the ON/OFF of the next frame read control signal 26 and the ON/OFF of the control signal 27 are controlled by the first decoding control circuit 13 and a mode in which they are controlled by the second decoding control circuit 14 is executed by the switches 16 and 17. The switches 16 and 17 are switched in parallel by a switching signal which is inputted by the user through a terminal 48.

The decoding process in the high-speed reproducing mode, which is executed by using the frame count number according to the third embodiment, namely, the operation in the case where the switches 16 and 17 are switched to the mode in which the ON/OFF of the next frame read control signal 26 and control signal 27 are controlled by using the second decoding control circuit 14 in FIG. 3, will now be described by with reference to the flowchart of FIG. 6.

Figure 6:
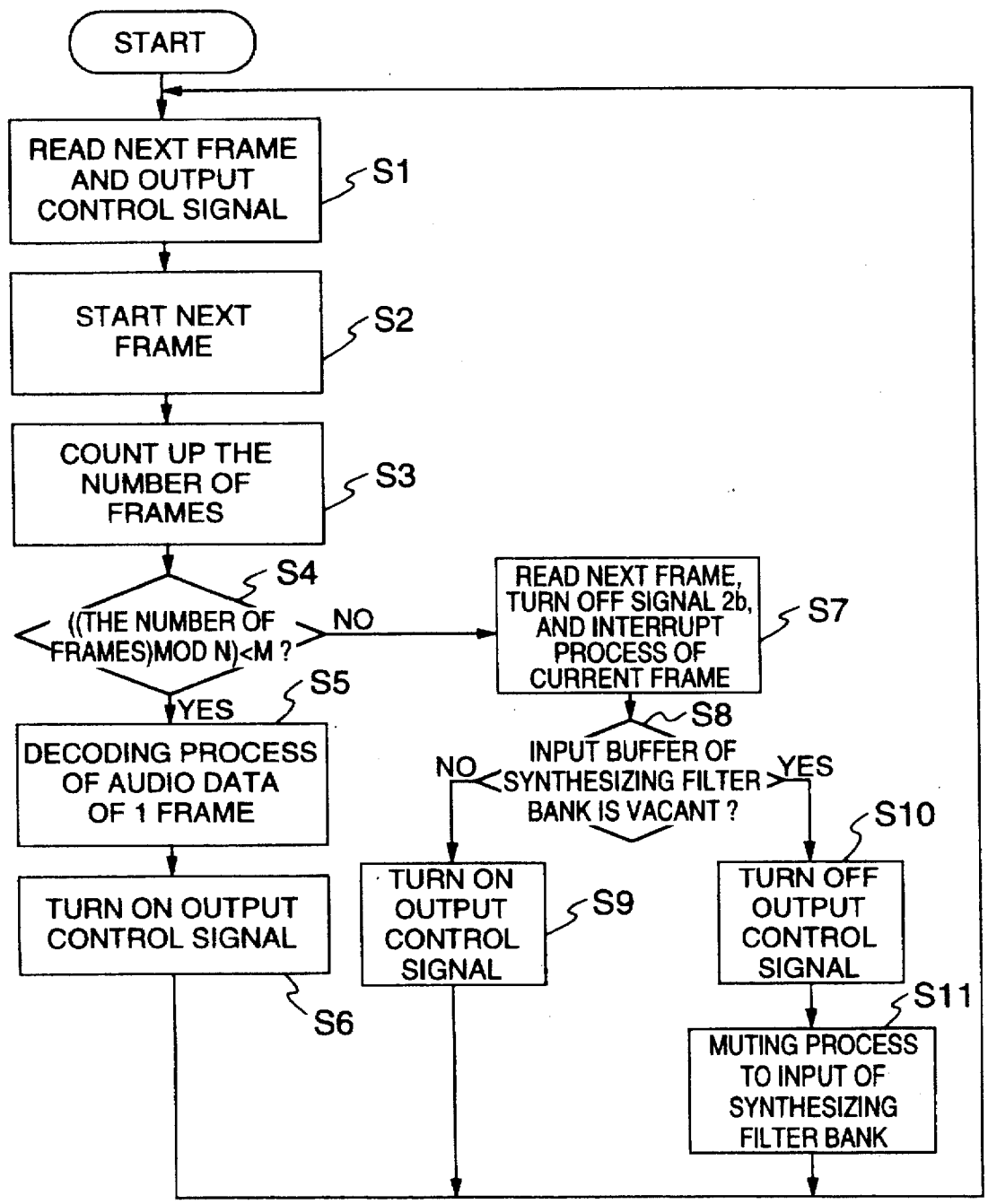
FIG. 6 is a flowchart showing the operation of a decoding process in the high-speed reproducing mode using the frame count number of the encoded data decoding apparatus according to the third embodiment.

In FIG. 6, in step S1, the second decoding control circuit 14 turns on the next frame read control signal 26. When the demultiplexing circuit 1 receives the signal 26 through the switching circuit 16, the demultiplexing circuit 1 starts the process of the next frame in step S2.

In step S3, the counter circuit 15 increases the frame number at this time by "1". The frame number counted by the counter circuit 15 is inputted to the second decoding control circuit 14. The reproduction frame rate is also inputted to the second decoding control circuit 14 through the input terminal 25. The second decoding control circuit 14 determines whether the current frame is decoded or not on the basis of the frame count number and the reproduction frame rate.

Namely, when the reproduction frame rate is equal to m/n (n is a constant integer, m denotes the number of frames to be reproduced among n frames: n>m), a check is made in step S4 to see if the remainder obtained by dividing the frame count number by n is smaller than m. When the remainder is smaller than m, the second decoding control circuit 14 decides that the frame is to be decoded, turns on the control signal 26, and continues the process of one frame. That is, the data of one frame is decoded in step S5. The output control signal 27 is turned on in step S6 and is supplied to the muting circuit 11 through the switching circuit 17, thereby outputting the decoded audio data.

After that, the processing routine returns to step S1 and the next frame read control signal is turned on again. The decoding of the next frame is started from step S2. A symbol "mod" (modulus) in step S4 of FIG. 6 denotes a remainder calculation.

On the other hand, when the remainder is equal to or larger than m in step S4, the second decoding control circuit 14 determines that the frame is not to be decoded in step S7, turns off the control signal 26, and interrupts the process of the current frame. In step S8, the buffer memory 10A in the synthesizing filter bank circuit 10 is checked. In a manner similar to the case of the high-speed reproduction decoding control by the floating coefficient mentioned above, only when the buffer memory becomes vacant does the second decoding control circuit 14 turn off the output control signal 27 to the muting circuit 11 in step S10. In step S11, a control is performed by the muting process so as not to generate a sound that is hard to listened to. When the input buffer memory is not vacant, the output control signal 27 is turned on in step S9.

After completion of the process of checking of the buffer memory 10A in the synthesizing filter bank circuit 10 as mentioned above, the processing routine returns to step S1. The next frame read control signal 26 to the demultiplexing circuit 1 is again turned on. When the next frame read control signal 26 is turned on, the demultiplexing circuit 1 starts to read out the next frame without outputting the signal information of each band of the current frame which is being decoded to the inverse quantizing circuits 2 to 5. With this method, the current frame is skipped and high-speed reproduction is executed.

Figure 8A:
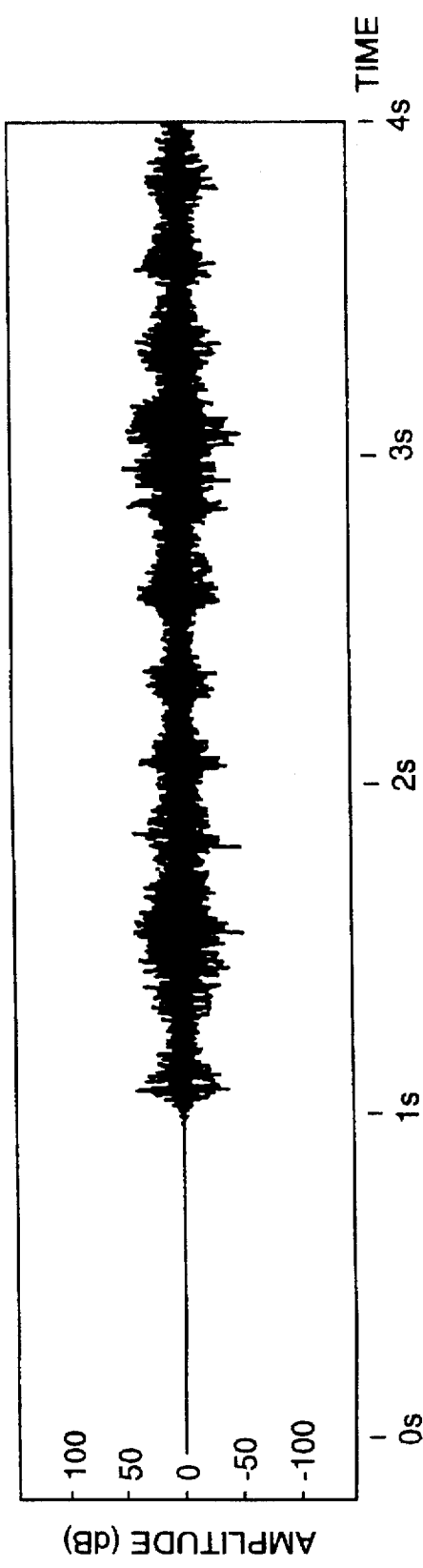
Figure 8B:
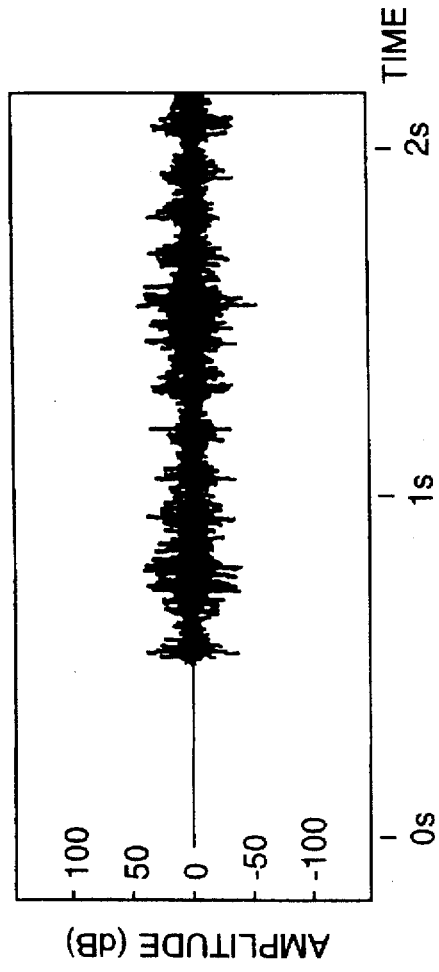

An example of the original sound signal of music is shown in FIG. 8A. FIG. 8B shows a result in the case where after the original sound signal was encoded, high-speed reproduction based on the frame count number is executed at a frame rate of ½. It will be understood that according to a waveform of FIG. 8B, different from the high-speed decoding control by the floating coefficient, the soundless portion is also outputted and the waveform has a shape such that the waveform of FIG. 8A is compressed as a whole into ½ in the time base direction. In high-speed reproduction by the frame count number, in this example, the data of one frame is skipped and not decoded every other frame. However, the contents of the original sound can be sufficiently understood.

As mentioned above, the signals to control the ON/OFF of the next frame read control signal 26 and the output control signal 27 which are outputted from the first decoding control circuit 13 and the second decoding control circuit 14 can be selected by the switching circuits 16 and 17. When reproducing the human voice at a high speed, the user selects the output of the first decoding control circuit 13. When reproducing music or the like at a high speed, the output of the second decoding control circuit 14 is selected. Thus, the high-speed reproduction suitable for the signal to be reproduced can be executed.

As also understood from the above description, since the encoded data decoding apparatus according to the invention is constructed so as to properly perform a skip of the decoding process to the relevant frames which satisfy a predetermined condition on the basis of the floating coefficient included in the header information or the number of input frames of the encoded data, the high-speed reproduction of the encoded data can be realized by a simple circuit construction as compared with the conventional method. Even if the whole circuit is not operated at a high speed, the high-speed reproduction of the encoded data can be realized.

Further, for example, when performing the high-speed reproduction of a human voice or the like, by executing the high-speed reproduction decoding control using the floating coefficient, the soundless portion of the original voice is deleted and only the sound portion is reproduced at a high speed. An output which is easily to listened to and in which the reproduction sound is not changed with respect to the frequency, as compared with the original voice can be obtained. For example, when a voice such that the sound portion continues like music is reproduced at a high speed, the contents of the music can be listened to at a high speed by executing the high-speed reproduction decoding control based on the number of input frames.

In the third embodiment, only the second decoding control circuit 14 may be used, while omitting the first decoding control circuit 13, depending the use of the apparatus.

An image audio multiplexed data decoding apparatus using the encoded data decoding apparatus of the invention will now be described. The image audio multiplexed data decoding apparatus is an apparatus for expanding, for example, the compressed and multiplexed image data and audio data which are sent from a transmission path or reproduced from a recording medium. The encoding of the audio data has already been described.

For a conventional encoding method of an image signal, a method of ISO/IEC 11172-2, called an MPEG method can be used. The detailed description about the MPEG method is omitted here.

The image data encoded by the above mentioned MPEG method and the audio data encoded by the above mentioned MPEG audio method are multiplexed in a form considering they will be synchronized when reproduced. The multiplexed data is transmitted through a communication line (not shown) or stored in a memory circuit (not shown).

An example of a conventional image audio decoding apparatus using these encoding techniques will now be described by using FIG. 12.

As mentioned above, the image data encoded by the MPEG method and the audio data encoded by the MPEG audio method are multiplexed in a form in which the image and audio sound are synchronized at reproduction. The multiplexed data is sent in a form of a series of data frames. A memory circuit 51 receives the data and holds at least one frame thereof.

In the case of ordinary reproduction, the multiplexed encoded image data and encoded audio data stored in the memory circuit 51 are read out by a reading circuit 52 and sent to an image/audio data demultiplexing circuit 53. In the image/audio data demultiplexing circuit 53, the encoded image data and encoded audio data which are multiplexed are separated. The encoded image data separated in this instance is supplied to an image buffer circuit 54. The encoded audio data is supplied to an audio buffer circuit 55.

The encoded image data sent to the image buffer circuit 54 is subsequently transferred to an image decoding circuit 56 and is subjected to a decoding process. The image signal decoded by the image decoding circuit 56 is outputted through an image output terminal 71.

The encoded audio data sent to the audio buffer circuit 55 is supplied to an audio decoding circuit 57 and is subjected to a decoding process. The audio signal decoded by the audio decoding circuit 57 is outputted through an audio output terminal 72. The above processes are executed for every frame in a manner similar to the encoded data decoding apparatus.

As one of application examples of the image audio encoding/decoding techniques as mentioned above, a digital VTR is mentioned. In the digital VTR, it is desired to realize a fast-forward reproducing (high-speed reproducing) function in a manner similar to the ordinary VTR.

Figure 12:
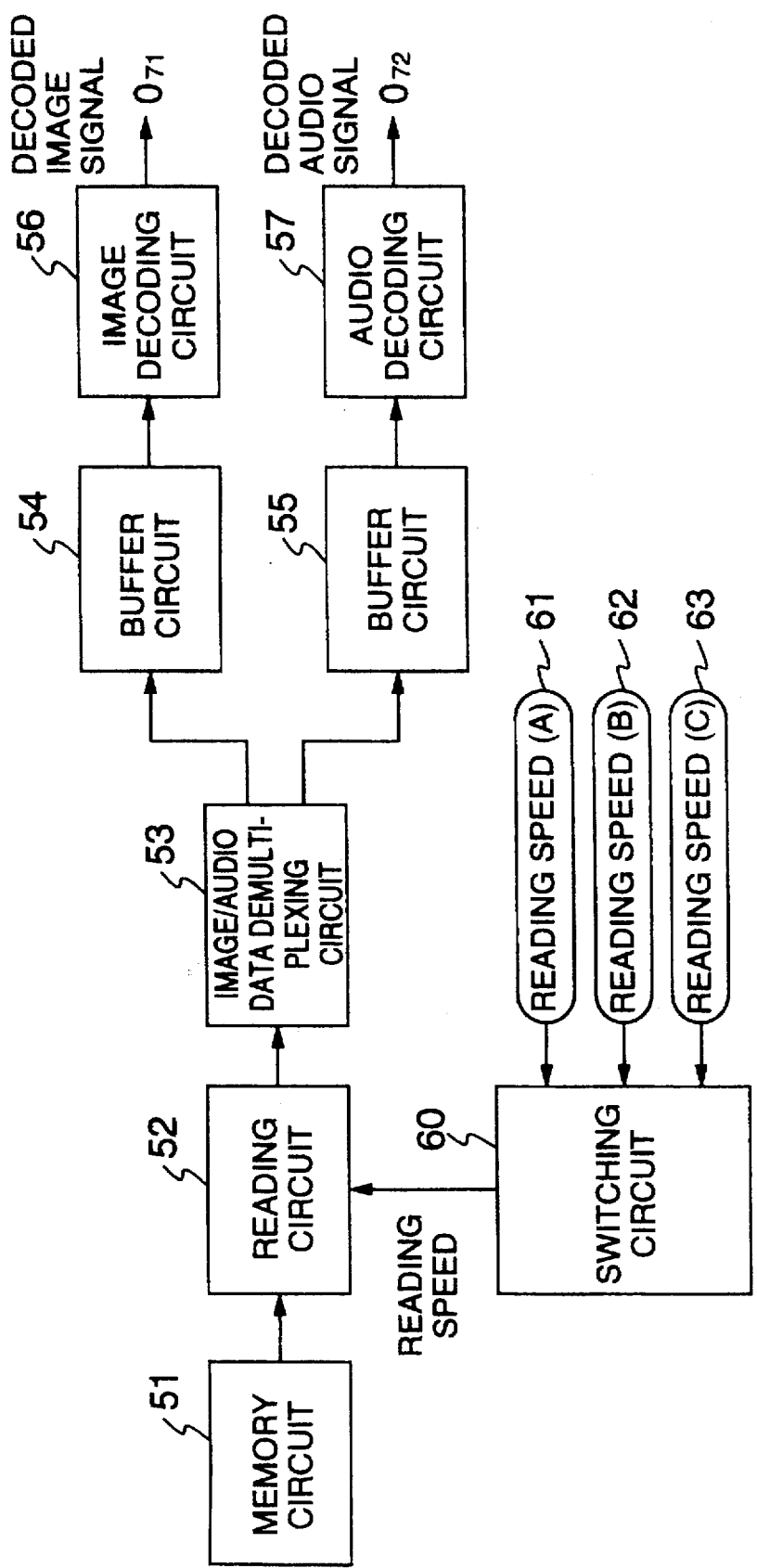
FIG. 12 is a block diagram showing a construction of a conventional encoded image audio multiplexed data decoding apparatus.

As an example of a method of realizing the fast-forward reproduction of the image signal and audio signal, as shown in FIG. 12, there is a method whereby an arbitrary speed is selected from a plurality of preset reading speeds A, B, and C by a switching circuit 60 and the reading circuit 52 is controlled in accordance with the selected speed.

Namely, in this method, a proper speed is selected from the preset reading speeds A, B, and C by the switching circuit 60. The encoded image data and encoded audio data are read out from the accumulating circuit 51 at the selected speed. The image decoding circuit 56 and audio decoding circuit 57 operate in accordance with the reading speed.

When the user uses information accumulated in the digital VTR, for example, there is a case where the user wants to select and refer only to a portion in which the audio information has been recorded, as in a the case where the user desires to refer only to a portion including a participant's speech in a VTR, for example when a conference has been recorded or the like.

In this case, there are many cases where the high speed reproduction is used in order to search a portion which the user wants to refer to. In the above conventional image audio decoding apparatus, however, since reproducing speeds of the image and the voice are determined in accordance with the preset reading speed, when high-speed reproduction is designated, not only the image, but also the voice are reproduced at a high speed. Therefore, the reproduced voice is very hard to be to listen. Therefore, a method whereby a portion to be referred to is retrieved while observing an image that is reproduced at a high speed is performed.

According to such a method, however, since whether the voice of a speaker is recorded correspondingly to the reproduced image or not is estimated from the image and retrieved by a user, there is a problem that it is not easy to search the portion in which the voice is recorded and the operation of searching a desired voice portion is troublesome.

Even if reproducing a voice at a speed such that it can be barely listened, in order to allow the user to refer to a portion in which necessary audio information has been recorded, the user must retrieve while listening to the reproduced sound, find a desired location, and after that, return to an ordinary speed and reproduce. As mentioned above, the user needs to execute the operations for retrieving while listening to the reproduced sound, finding a desired location, and after that, changing the reproducing speed. There is also a problem that the operation is very complicated.

The problem mentioned above is solved by using the encoded data decoding apparatus according to the invention.

Figure 9:
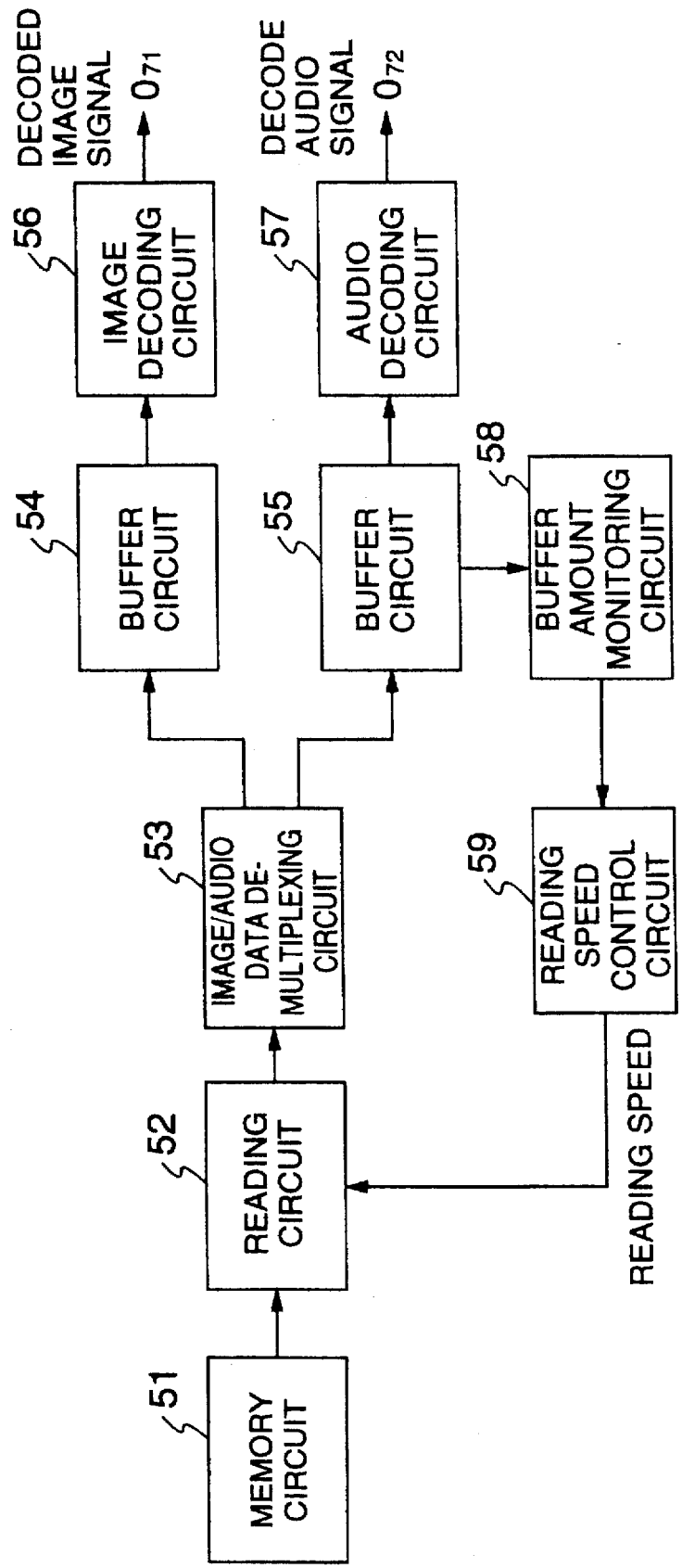
FIG. 9 is a block diagram showing a construction of an encoded image audio multiplexed data decoding apparatus according to the invention.

An embodiment of an image audio multiplexed data decoding apparatus using the encoded data decoding apparatus according to the invention will now be described with reference to FIG. 9. The audio decoding circuit 57 in FIG. 9 corresponds to the encoded data decoding apparatus according to the invention and has a circuit construction as shown in, for example, FIG. 1. As an image decoding circuit 56, for example, a well-known apparatus disclosed in JP-A-6-268969 or JP-A-6-276485 can be used. Explanation will now be made hereinbelow on the assumption that the audio decoding circuit 57 has the circuit construction shown in FIG. 1.

In the image audio decoding apparatus of the present embodiment, operations similar to those of the conventional image audio decoding apparatus are executed when reproducing at an ordinary speed. Therefore, the detailed description of these operations is omitted here.

In the case of performing high-speed reproduction, only a portion of the encoded audio data in which the audio information exists is selected and high-speed reproduction can be realized, as mentioned above, by using the audio decoding circuit 57 having the circuit construction as shown in FIG. 1.

A case where the high-speed reproduction as mentioned above is performed in the audio decoding circuit 57 is now considered. In this case, even in the high-speed reproducing mode, with regard to the frame which includes the audio information, and hence has the floating coefficient equal to or higher than the set level, the data of the same amount as that in the ordinary reproducing mode is stored in the audio buffer circuit 55 for temporarily storing the encoded audio data.

However, with respect to a frame which includes no audio information and hence has the floating coefficient lower than the set level, the decoding process is not performed and the encoded audio data is skipped and the reading speed rises. Therefore, an amount of data which is temporarily stored into the audio buffer circuit 55 is smaller than that in the ordinary reproducing mode. A buffer amount monitoring circuit 58 monitors such a change in data amount and transfers the change in data amount to a reading speed control circuit 59.

In the reading speed control circuit 59, when an amount of data temporarily stored in the audio buffer circuit 55 is large, a speed at which the multiplexed encoded image and audio data are read out from the memory circuit 51 is made slow. When the amount of data temporarily stored in the audio buffer circuit 55 is small, the speed at which the encoded data is read out from the memory circuit 51 is controlled to be fast. The reading speed which is set as mentioned above is transferred to the reading circuit 52.

As will be apparent from the above description, in this embodiment, the decoding control circuit 13 provided in the audio decoding circuit 57 with the circuit construction shown in FIG. 1 judges the sound portion and the soundless portion on the basis of the value of the floating coefficient. By normally decoding the sound portion, the data is reproduced at ordinary speed. By skipping the soundless portion without decoding, the data is reproduced at high speed.

The data amount in the audio buffer circuit 55 which changes frame by frame in accordance with the presence or absence of the audio information, is monitored by the buffer amount monitoring circuit 58. The reading speed is controlled by the reading speed control circuit 59 so as to set the reading speed at a value corresponding to the data amount. Thus, the reproducing speed of the image data is controlled in accordance with the reproducing speed of the audio data which changes correspond to the presence or absence of the audio information in each frame.

Therefore, for example, when it is desired to refer, in the VTR recording the contents of a conference, only to portions including the attendant's speech, the portion in which the voice signal is recorded is searched at a high speed and when the portion including the voice signal is found, the reproducing speed of the image and audio corresponding to the voice portion, is automatically returned to the ordinary speed. Thus, the operation for searching the portion including the voice signal and reproducing it can be remarkably simplified.

According to the image/audio decoding apparatus of the invention as described above, the data amount in the audio buffer means for temporarily storing the encoded audio data is monitored and the speed at which the multiplexed encoded image and audio data are read out is controlled in accordance with the change in data amount. Therefore, when the decoding and reproducing speed of the encoded audio data rises as a whole, the decoding and reproducing processes of the encoded image data can be also performed at a high speed. In the case where the decoding process is performed in the ordinary manner and the decoding and reproducing speeds of the encoded audio data are set to the ordinary speed, the decoding and reproducing processes of the encoded image data can be also executed at ordinary speed. The reproducing speed of the image data can be automatically controlled in accordance with the reproducing speed of the audio data. Thus, the user doesn't need to perform operations to change the reproducing speed of the image data in accordance with the reproducing speed of the audio data. The operating efficiency in the case of searching and reproducing the portion including the audio signal can be improved.

I claim:

1. An encoded data decoding apparatus comprising:
   a circuit for sequentially receiving a series of encoded data frames, wherein each of said data frames includes a plurality of multiplexed band data classified into a plurality of predetermined frequency bands, respectively, each of said multiplexed band data including encoded information data belonging to a corresponding one of the frequency bands and processing data used for encoding said encoded information data, and for processing each of said data frames so as to separate said encoded information data and said processing data from each other;

circuit means for decoding said encoded information data by using said processing data separated from said information data in each of said frequency bands; and means for determining whether each of said data frames is to be decoded or not depending on whether a level of a signal included in said encoded information data and having a frequency within a least one of said predetermined frequency bands is smaller than a preset threshold value.

2. An apparatus according to claim 1, wherein said level of the signal included in said encoded information data is a maximum one of absolute values of respective signals in said plurality of frequency bands.

3. An apparatus according to claim 2, wherein said processing data includes a floating coefficient indicative of the level of a signal included in said encoded information data and having a frequency in each of said plurality of frequency bands.

4. An apparatus according to claim 3, wherein said means for determining whether each of said data frames is to be decoded or not includes means for comparing said preset threshold value with the floating coefficient corresponding to one of the frequency bands in which the maximum one of absolute values of respective signals in said plurality of frequency bands is included.

5. An apparatus according to claim 1, further including means for presetting at least one of said frequency bands.

6. An apparatus according to claim 1, further including a synthesizing circuit for synthesizing the output signals of said decoding circuit means regarding said frequency bands, respectively, and a muting circuit connected between said decoding circuit means and said synthesizing circuit for supplying to said synthesizing circuit selectively said output signals of said decoding circuit means or zero signals in place of said output signals.

7. An apparatus according to claim 1, further including frame selecting means for selecting the frames to be processed so that only the selected frames among said series of data frames are decoded and means for making operative selectively either one of said means for determining whether each of said data frames is to be decoded or not and said frame selecting means.

8. An encoded data decoding apparatus comprising:

a circuit for sequentially receiving a series of encoded data frames, wherein each of said data frames includes a plurality of multiplexed band data classified into a plurality of predetermined frequency bands, respectively, each of said multiplexed band data including encoded information data belonging to a corresponding one of the frequency bands and processing data used for encoding said encoded information data, and for processing each of said data frames so as to separate said encoded information data and said processing data from each other;

circuit means for decoding said encoded information data by using said processing data separated from said information data in each of said frequency bands; and means for selecting those data frames from said series of data frames so that only those selected data frames are decoded, wherein said selecting means includes decoding frame determining means for determining whether each of said data frames is to be decoded or not depending on whether a level of a signal included in said encoded information data and having a frequency within at least one of said predetermined frequency bands is smaller than a preset threshold value.

9. An apparatus according to claim 8, wherein said frame selecting means further includes reproduction frame rate presetting means for presetting a reproduction frame rate indicative of a ratio of a number of the frames to be processed among a predetermined number of the frames and means for selectively operating one of said decoding frame determining means and said reproduction frame rate presetting means.

10. An apparatus according to claim 8, further including: a synthesizing circuit for synthesizing output signals of said decoding circuit means regarding said frequency bands, respectively, and a muting circuit connected between said decoding circuit means and said synthesizing circuit for supplying to said synthesizing circuit selectively the output signals of said decoding circuit means or zero signals in place of said output signals.

11. An image audio multiplexed data decoding apparatus comprising:

memory means for sequentially receiving a series of encoded data frames and holding at least one frame, wherein each of said data frames includes image data and audio data which are encoded and multiplexed;

reading means for reading out the data frames held in said memory means at a controlled speed;

means for mutually separating said encoded image data and said encoded audio data which are included in each of said data frames read out by said reading means;

image decoding circuit for decoding said separated encoded image data;

an audio data buffer for temporarily storing said separated encoded audio data;

an audio decoding circuit for reading out and decoding said encoded audio data stored in said audio buffer wherein said audio decoding circuit includes selecting means for selecting ones of said data frames so that the separated audio data included only in selected ones of said data frames are decoded;

means for monitoring an amount of the audio data stored in said audio data buffer; and means for controlling a reading speed of said data frame by said reading means in accordance with a change in amount of the audio data stored in said audio buffer that is monitored by said monitoring means.

12. An apparatus according to claim 11, wherein said audio data decoding circuit includes:

a circuit for sequentially receiving said series of encoded data frames, wherein each of said series of data frames includes a plurality of multiplexed band data classified into a plurality of predetermined frequency bands, each of said multiplexed band data including encoded information data belonging to a corresponding one of the frequency bands and processing data used for encoding said encoded information data, and for processing each of said data frames so as to separate said encoded information data and said processing data from each other;

circuit means for decoding said encoded information data by using said processing data separated from said information data in each of said frequency bands; and means for determining whether each of said data frames is to be decoded or not on the basis of a level of said encoded information data belonging to at least one frequency band selected from said frequency bands included in said data frame.

* * * * *

UNITED STATES PATENT AND TRADEMARK OFFICE
CERTIFICATE OF CORRECTION

PATENT NO. : 5,765,136
DATED : June 9, 1998
INVENTOR(S) : Fukuchi

It is certified that error appears in the above-identified patent and that said Letters Patent is hereby corrected as shown below:

Column 15, line 7, change "a least" to --at least--.

Signed and Sealed this

First Day of September, 1998

Attest:

BRUCE LEHMAN

Attesting Officer          Commissioner of Patents and Trademarks